(12) United States Patent
Ertek

(10) Patent No.: US 8,459,207 B2
(45) Date of Patent: Jun. 11, 2013

(54) ANIMAL FEEDING APPARATUS

(76) Inventor: Steven Ertek, Altamonte Springs, FL (US)

( * ) Notice: Subject to any disclaimer, the term of this patent is extended or adjusted under 35 U.S.C. 154(b) by 119 days.

(21) Appl. No.: 12/984,543

(22) Filed: Jan. 4, 2011

(65) Prior Publication Data

US 2012/0111279 A1    May 10, 2012

(51) Int. Cl.
*A01K 5/00* (2006.01)
(52) U.S. Cl.
USPC .......................................... 119/61.5
(58) Field of Classification Search
USPC ............. 119/51.01, 61.5, 161, 165, 167–170, 119/69.5, 61.53, 65.8, 66.2; 220/574.3, 573.5; 47/65.8, 66.2, 71; D30/129, 132, 133
See application file for complete search history.

(56) References Cited

U.S. PATENT DOCUMENTS

| | | | | |
|---|---|---|---|---|
| 1,330,828 A | * | 2/1920 | Wilson | 4/258 |
| 3,698,594 A | * | 10/1972 | Boehlert | 220/495.01 |
| 4,505,226 A | * | 3/1985 | Carlson | 119/166 |
| 4,649,578 A | * | 3/1987 | Vargo | 119/161 |
| 5,309,670 A | * | 5/1994 | Bates | 47/71 |
| 5,353,743 A | * | 10/1994 | Walton | 119/166 |
| 5,366,103 A | * | 11/1994 | Abernathy et al. | 220/23.83 |
| 5,630,377 A | * | 5/1997 | Kumlin | 119/172 |
| 5,709,167 A | * | 1/1998 | Kelley | 119/61.5 |
| 5,791,289 A | * | 8/1998 | Savicki | 119/165 |
| 5,797,346 A | * | 8/1998 | Lewis | 119/166 |
| 6,390,323 B1 | * | 5/2002 | Alticosalian | 220/495.03 |
| 6,622,423 B1 | * | 9/2003 | Riccardi | 47/1.1 |
| 7,055,460 B2 | * | 6/2006 | Sjogren | 119/166 |
| 7,121,228 B1 | * | 10/2006 | Klauber | 119/161 |
| 2005/0081793 A1 | * | 4/2005 | Sannikka | 119/165 |

FOREIGN PATENT DOCUMENTS

GB    2152794    *  8/1985

* cited by examiner

*Primary Examiner* — Rob Swiatek
*Assistant Examiner* — Ebony Evans
(74) *Attorney, Agent, or Firm* — Gokalp Bayramoglu

(57) ABSTRACT

An animal feeding apparatus that comprises an outside body that is made of a durable material and an inside unit attached to the outside body but located inside of it. The inside unit is made of disposable material. The outside body has grooves at the bottom. The inside unit has notches at the bottom wherein those notches fit into grooves to prevent inside unit from moving while animal is eating from the feeding apparatus. The apparatus of this invention solves the hygiene issue and does not require continuous cleaning.

8 Claims, 4 Drawing Sheets

ANIMAL FEEDING APPARATUS

BACKGROUND OF THE INVENTION

1. Field of the Invention

The present invention relates to an animal feeding apparatus. More specifically, the invention relates to the animal feeding apparatus wherein part of the apparatus is disposable.

2. Description of Related Art

Animal feeding can be accomplished by using many different apparatus such as bowls and dishes. These bowls and dishes are usually made of durable-rigid materials. While the durable material provides long lifetime for the feeding device, another problem of cleanness arises that may cause potential infection. Potential infection may also affect pet owner due to handling of animal apparatus. Another type of feeding apparatus for domestic animals is disposable feeding apparatus. These apparatus can be quite inexpensive as they use low cost material. Due to low cost material these apparatus structure is usually weak and unstable. They can flip over easily. Therefore there is a need for a feeding apparatus that is strong enough yet does not cause infection or does not require cleaning.

SUMMARY OF THE INVENTION

The current invention is an animal feeding apparatus that comprises an outside body that is made of a durable material and an inside section attached to outside body but located inside of it. The inside section is made of disposable material. The apparatus of this invention solves the hygiene issue and dos not require continuous cleaning.

BRIEF DESCRIPTION OF THE DRAWINGS

The above and other features of the present disclosure becomes more apparent by describing in detail embodiments thereof with reference to the accompanying drawings, in which.

DETAILED DESCRIPTION

Figure 1:
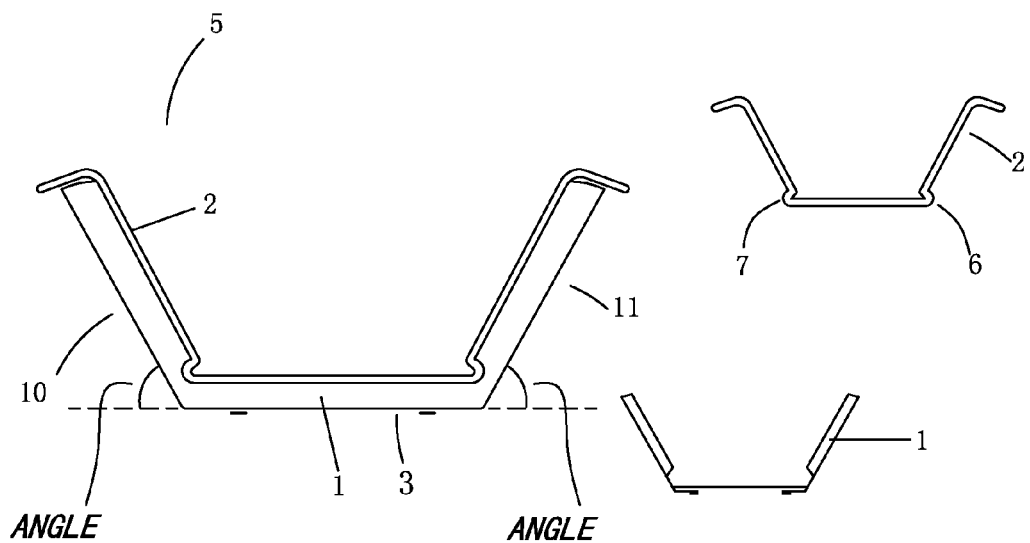
FIG. 1 is a view of the animal feeding apparatus.

A view of the first embodiment of the present invention, an animal feeding apparatus 5, is shown in FIG. 1. The animal feeding apparatus comprises a base unit 1 and an inner unit 2 that fits into the base unit 1. The base unit 1 is built using a durable material such as metal, plastic, wood or stone. Base unit 1 is a single unit that comprises a bottom part 3 and plurality of sidewalls 10 and 11. Sidewalls 10 and 11 have a certain slope. The angle of the slope can be adjusted based on the usage need. For example if the animal is a large animal then the height of base unit 1 can be higher then it would be for a small animal and the slope of sidewalls can be larger.

Base unit 1 has two grooves 8 and 9 at the bottom part 3. Notches 6 and 7 at the bottom of inner unit 2 fit into grooves 8 and 9. When inner unit 2 is placed into the base unit 1 and when it is pushed down, the inner unit 2 snaps into the base unit 1 so that notches 6 and 7 at the bottom of the inner unit 2 snap into grooves 8 and 9 at the bottom part 3 of the base unit 1. Once the inner unit 2 snaps into the base unit 1 as described here, the inner unit 2 becomes a stationary unit and does not move. This is important because when animal is eating from the feeding apparatus, the inner unit 2 should be fixed into the base unit 1. Notches 6 and 7 and grooves 8 and 9 work as the snap in mechanism to prevent the inner unit 2 from moving within the base unit 1.

Figure 2:
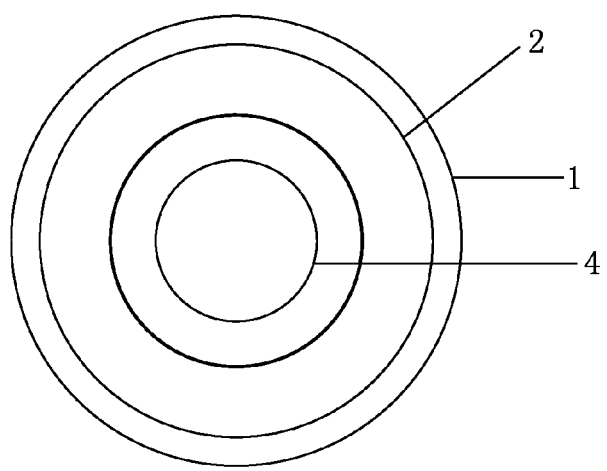
FIG. 2 is a top view of the animal feeding apparatus.

FIG. 2 is the top view of the animal feeding apparatus 1. In this figure, the base unit 1 has a hole 4 at the bottom 3 of the base unit 1. The hole 4 is used to push out or pull out the inner unit 2 when one wishes to replace the inner unit 2 with another inner unit. This way, one does not have to pick up the inner unit 2 if one does not want to touch the inner unit 2.

Figure 3:
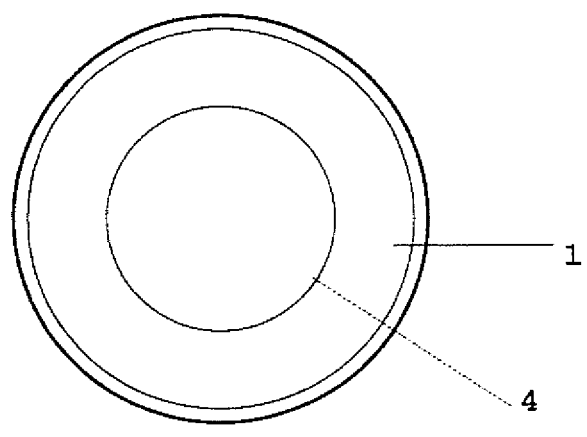
FIG. 3 is a bottom view of the animal feeding apparatus.

FIG. 3 is the bottom view of the animal feeding apparatus 1. The base unit 1 has a hole 4 at the bottom. The hole 4 is used to replace the inner unit 2 with a new inner unit as described above.

Figure 4:
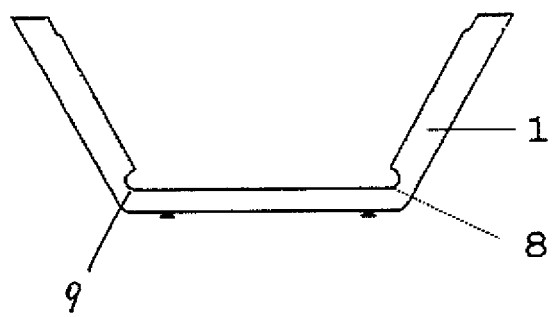
FIG. 4 is a sectional view of the base unit of the animal feeding apparatus.
Figure 5:
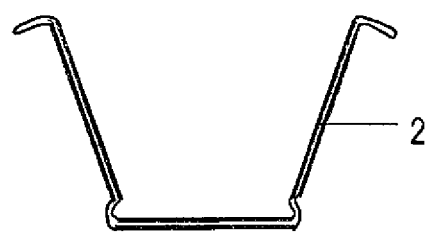
FIG. 5 is a sectional view of the disposable inner bowl.

FIG. 4 shows another embodiment of the animal feeding apparatus. In this embodiment, the base unit 1 has a bottom part 3 and sidewalls 10 and 11. Sidewalls 10 and 11 have certain slope. Grooves 8 and 9 are located at the bottom of the base unit 1. Grooves 8 and 9 used to snap notches 6 and 7 at the bottom of the inner unit 2. The hole 4 at the bottom of the base unit 1 is not shown in FIG. 4.

Figure 6:
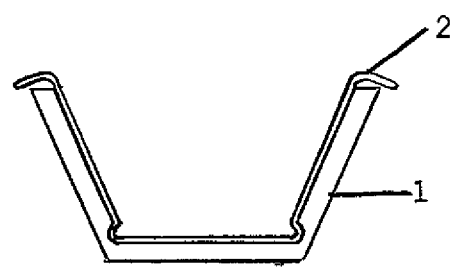
FIG. 6 is a sectional view of the base and the inner bowl.

FIG. 6 shows a sectional view of the animal feeding device 1. In this figure, the inner unit 2 is placed into the base unit 1. Notches 6 and 7 on the bottom of inner unit 2 snap into grooves 8 and 9 at the bottom of the base unit 1.

Figure 7:
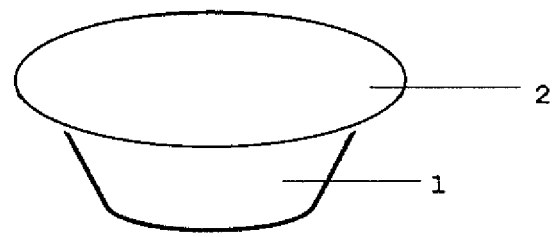
FIG. 7 is a front view of the animal feeding apparatus.

FIG. 7 is the front view of the animal feeding apparatus. The inner unit 2 is located in the base unit 1.

Figure 8:
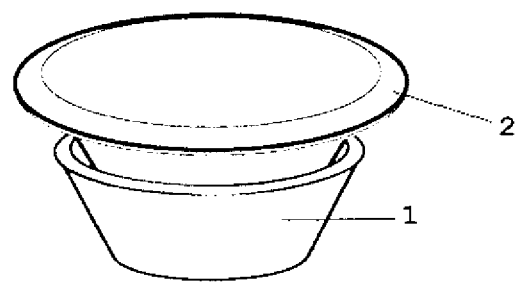
FIG. 8 is a view of animal feeding apparatus' pop up position.

FIG. 8 is another view of the animal feeding apparatus wherein the inner unit 2 is removed from the base unit 1. The inner unit 2 is a disposable unit.

This invention has been described with reference to embodiments. It shall be understood, however, that many alternative modifications and variations will be apparent to those having ordinary skill in the pertinent art in light of the foregoing description. Accordingly, the present invention embraces all such alternative modifications and variations as fall within the spirit and scope of the appended claims.

What is claimed is:

1. An animal feeding apparatus comprising:
   a base unit;
   an inner unit;
   a plurality of grooves at the bottom of said base unit;
   a plurality of notches at the bottom of said inner unit; and
   means for replacing the inner unit;
   wherein when said inner unit is inserted into said base unit said plurality of notches at the bottom of said inner unit snap into said plurality of grooves at the bottom of said base unit for securing said inner unit from moving within said base unit.

2. The animal feeding apparatus of claim 1 wherein said base unit is made of durable material selected from a group consisting of metal, wood, plastic and stone.

3. The animal feeding apparatus of claim 2 wherein the shape of said base unit is selected from a group consists of half sphere, rectangle and half cone.

4. The animal feeding apparatus of claim 3 wherein a plurality of angles between the bottom of said base unit and the sidewall of said base unit is adjustable.

5. The animal feeding apparatus of claim 1 wherein the means for replacing the inner unit is a hole located at the bottom of the base unit and the shape of said hole is selected from a group consisting of rectangle, circle, diamond, hexagonal and triangle.

6. The animal feeding apparatus of claim 1 wherein said inner unit is made of a soft durable material selected from a group consisting of paper and plastic.

7. The animal feeding apparatus of claim 1 wherein said inner unit is made of a soft material that forms the shape of said base unit when said inner unit is inserted into said base unit.

8. The animal feeding apparatus of claim 1 wherein said inner unit is disposable.

* * * * *